US009823459B2

(12) United States Patent
Bullard et al.

(10) Patent No.: US 9,823,459 B2
(45) Date of Patent: Nov. 21, 2017

(54) HIGH-STIFFNESS STRUCTURE FOR LARGER APERTURE TELESCOPE

(71) Applicant: Raytheon Company, Waltham, MA (US)

(72) Inventors: Andrew L. Bullard, Manhattan Beach, CA (US); Maciej D. Makowski, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/868,955

(22) Filed: Sep. 29, 2015

(65) Prior Publication Data

US 2017/0090178 A1     Mar. 30, 2017

(51) Int. Cl.
| | |
|---|---|
| *G02B 5/08* | (2006.01) |
| *G02B 7/182* | (2006.01) |
| *G02B 5/10* | (2006.01) |
| *G02B 23/16* | (2006.01) |
| *G02B 23/06* | (2006.01) |
| *G02B 7/183* | (2006.01) |

(52) U.S. Cl.
CPC ............. *G02B 23/16* (2013.01); *G02B 7/183* (2013.01); *G02B 23/06* (2013.01)

(58) Field of Classification Search
CPC  G02B 19/0042; G02B 7/183; G02B 26/0825; G02B 5/0808; G02B 5/10; G02B 23/06; G02B 23/16; G02B 17/00; G02B 17/02; G02B 5/08; G02B 5/26; G02B 7/18; G02B 7/182; G02B 26/0833; G02B 7/185; G02B 7/188; G02B 7/1822; G02B 7/1824; G02B 7/1825; G02B 7/1827; G02B 7/1828; G02B 17/0673; G02B 7/198; A47G 1/00; B60Q 1/2665; B60R 1/02; B60R 1/12; F24J 2/10; Y02E 10/45
USPC ........ 359/858, 838, 846, 847, 849, 853, 871
See application file for complete search history.

(56) References Cited

U.S. PATENT DOCUMENTS

| | | | | |
|---|---|---|---|---|
| 3,914,063 | A | * 10/1975 | Papayoti | E04B 1/1903 403/171 |
| 5,366,375 | A | * 11/1994 | Sarnicola | G09B 9/12 434/29 |
| 2005/0088734 | A1 | * 4/2005 | Basu | G02B 17/061 359/399 |

OTHER PUBLICATIONS

ITT Exelis, "2.4m Space Telescopes: Hardware Summary", Technical Specification, dated Sep. 4, 2012, 12 pgs.

(Continued)

*Primary Examiner* — Jade R Chwasz

(57) ABSTRACT

A triangular frame metering structure includes three side beams and three end pieces each connected between two of the side beams. Each end piece top and bottom is configured for connection of support loads, with all support loads connecting to the metering structure at the top or bottom of one of the end pieces. Secondary mirror focusing mechanisms mounted on the end piece tops support pairs of secondary mirror struts. Strut mounts on the end piece bottoms provide connections to pairs of primary mirror struts, base struts, and instrument struts. All support loads connected to the metering structure are thus connected only to the corners of the metering structure and are connected at a same radial distance from a central longitudinal axis. The metering structure has reduced mass with high stiffness for supporting large aperture telescopes.

20 Claims, 3 Drawing Sheets

(56) References Cited

OTHER PUBLICATIONS

Ponslet et al., "Conceptual Design Notes for Primary Metering Structures for the SNAP Telescope", Technical Specification, dated Apr. 25, 2000, 15 pgs.

* cited by examiner

HIGH-STIFFNESS STRUCTURE FOR LARGER APERTURE TELESCOPE

TECHNICAL FIELD

The present disclosure is directed in general to improved metering structures for space borne telescopes, and, more particularly, to metering structures providing lower mass and higher stiffness.

BACKGROUND OF THE DISCLOSURE

Efforts to increase the collection area and resolution of space borne telescopes require larger aperture sizes. Larger apertures drive the need for improved telescope structural characteristics such as reduced mass and/or increased stiffness. Optical telescopes with large apertures (greater than 50 centimeters) are very sensitive to any vibration that causes jitter of the line of sight. Jitter is usually primarily the result of vibration disturbance sources, such as momentum wheels, actuated solar arrays or antennas, or cryocoolers coupling with structural resonances of the structures supporting the optical elements and sensors. Jitter can often be reduced by stiffening the support structure to decouple the resonances from the disturbances by offsetting their frequencies.

SUMMARY OF THE DISCLOSURE

A triangular frame metering structure includes three side beams and three end pieces each connected between two of the side beams. Each end piece top and bottom is configured for connection of support loads, with all support loads connecting to the metering structure at the top or bottom of one of the end pieces. Secondary mirror focusing mechanisms mounted on the end plate tops support pairs of secondary mirror struts. Strut mounts on the end piece bottoms provide connections to pairs of primary mirror struts, base struts, and instrument struts. All support loads connected to the metering structure are thus connected only to the corners of the metering structure and are connected at a same radial distance from a central longitudinal axis. The metering structure has reduced mass with high stiffness for supporting large aperture telescopes.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
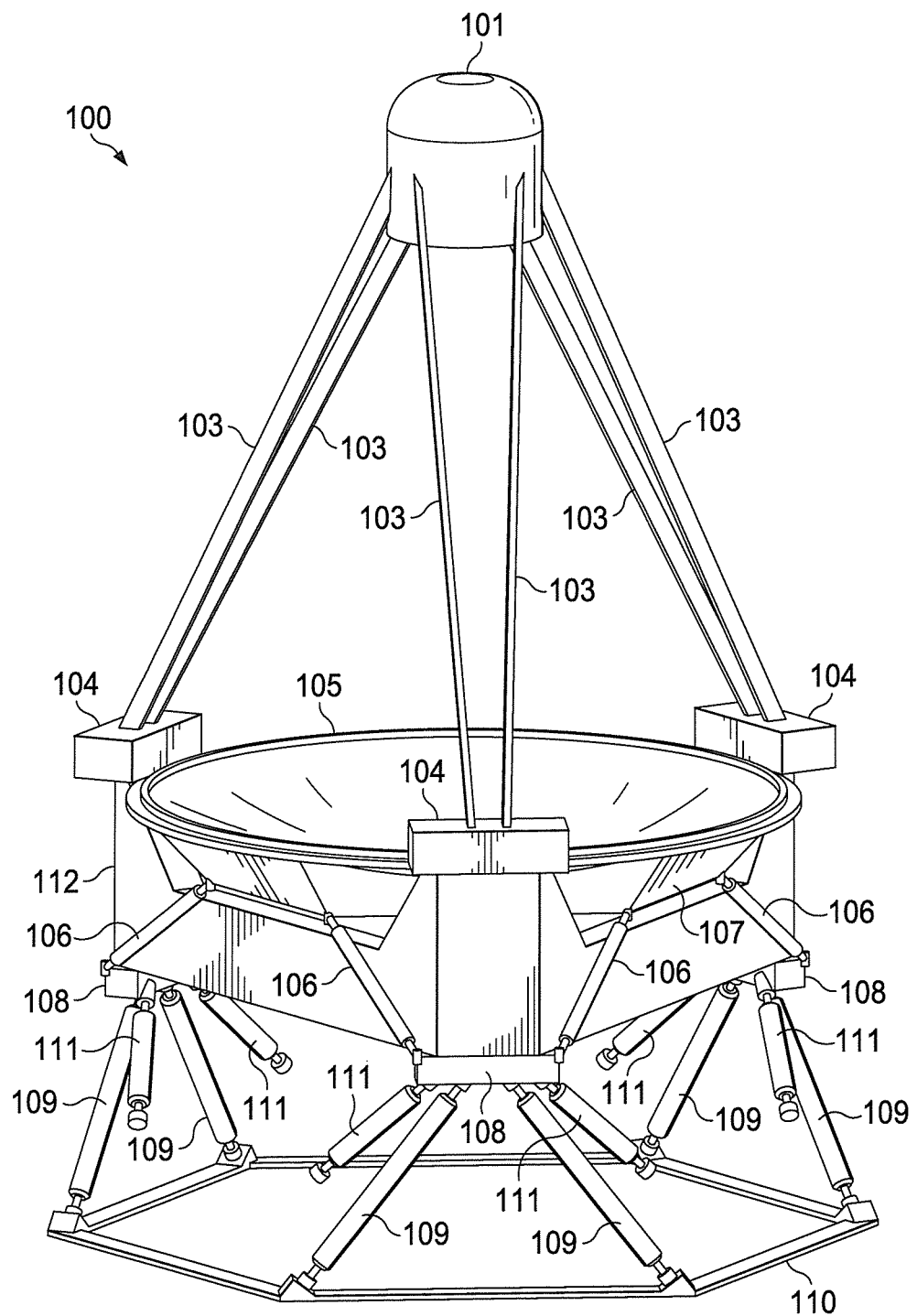
FIG. 1 illustrates a telescope support assembly including a high-stiffness metering structure for large aperture telescopes in accordance with embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

The metering structure (sometimes referred to as the "aft metering structure") is one part of the support system within the telescope subsystem of satellite or other space borne telescopes. Mounted on an exterior surface of the vehicle carrying the telescope, the support system that includes the metering structure supports the telescope's primary mirror assembly, the secondary mirror assembly, and the one or more instrument assemblies. The general mechanical support concept consists of a stiff base, the metering structure, supporting the primary mirror assembly and directly attached to the exterior of the spacecraft by some structure. The secondary mirror assembly and the one or more instrument assemblies are all supported by the metering structure.

The metering structure requires high stiffness, high dimensional stability (e.g., low coefficient of thermal expansion), and minimum obstruction of the telescope aperture in order to obtain high quality images. The metering structure should maintain the mirror system on the vehicle and hold the telescope components in position with sufficient accuracy to assure proper alignment and focus. Cylindrical, barrel-shaped or hexagonal sandwich panel structures are most commonly employed for metering structures within the larger telescope support system of previously proposed space borne telescope systems.

The metering structure described below achieves high stiffness with a low weight structure, and results in lower jitter due to higher frequency, lower amplitude resonant modes. The low jitter allows for more vibration from disturbance sources physically coupled to the telescope, such as momentum wheels or cryocoolers. Because the instrument(s) are supported through a structurally efficient interface that does not need to change for different instrument sizes, weights, or designs, the metering structure disclosed provides modularity of telescope and instrument(s).

FIG. 1 illustrates a telescope support assembly including a high-stiffness metering structure for large aperture telescopes in accordance with embodiments of the present disclosure. Telescope support assemblies of the type depicted in FIG. 1 typically include a thermal shroud over the secondary mirror and the secondary mirror support, shown generically as a secondary mirror assembly 101 in FIG. 1, and a baffle surrounding one or both of the primary mirror and the secondary mirror to reduce incidence of scattered light on those mirrors. Secondary support struts 103 support the secondary mirror assembly 101, which includes the thermal shroud, secondary mirror and secondary mirror support, and optionally a baffle. The secondary support struts 103 form one load on the metering structure 112, directly or, in the example shown, indirectly via a mounting structure 104. In the example of FIG. 1, a metering structure 112 and associated loading are depicted generally for purposes of illustration; in the present embodiment, the metering structure depicted in FIGS. 2 and 2A through 2C are preferably employed, with loading as described below. The secondary support struts 103 may be connected to the metering structure 112 in a movable manner. In the example of FIG. 1, for example, secondary mirror focus mechanisms such as alignment drive tubes (not shown) may be connected to move the mounting structure 104 affixed to the top of each end piece of metering structure 112.

While the primary mirror support 107 is shown as supported directly on the metering structure 112 in FIG. 1, primary mirror struts 106 may alternatively support the primary mirror support 107, which forms part of the primary mirror assembly. In the example shown, however, a primary mirror ring stop 105 on the primary mirror support 107 is supported by indirect connection to the primary mirror struts 106, and are connected to a mounting structure 108 on the bottom of each end piece of the metering structure 112. Pairs of base struts 109 also connect at the bottom of each end piece of the metering structure 112, connected at the opposite end to the base (e.g., a hexagonal frame) 110 secured to the exterior of the carrier vehicle. Instrument struts 111 directly or indirectly connect to the end piece of the metering structure 112, supporting one or more instruments (not shown in FIG. 1) including or coupled to the detector array on which light reflected from the primary and secondary mirrors is focused.

Those skilled in the art will recognize that the primary mirror support and secondary mirror support described above are physical structures with a size and shape depending upon the configuration of the primary mirror and secondary mirror, respectively.

Figure 2:
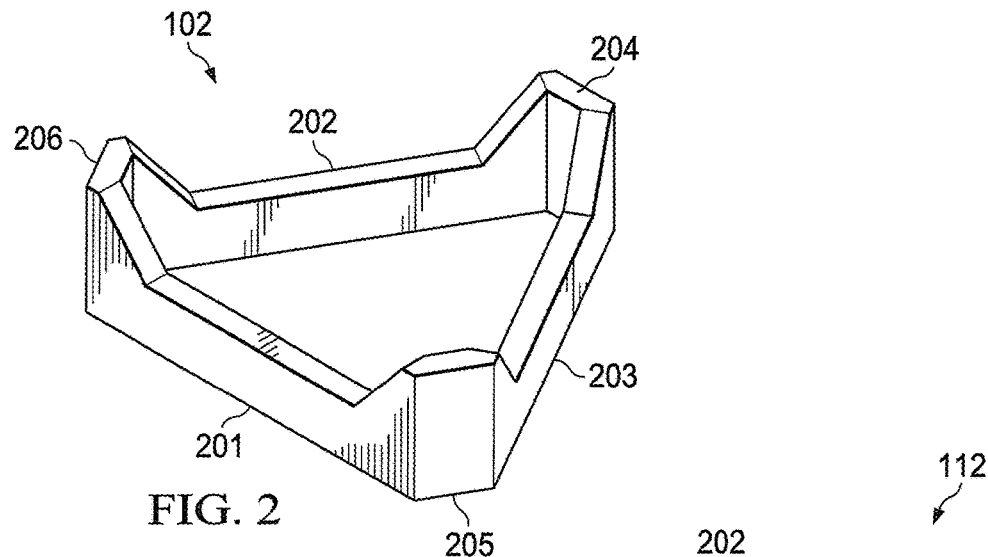
FIG. 2 is a perspective view of the metering structure within the telescope support assembly of FIG. 1.
Figure 2A:
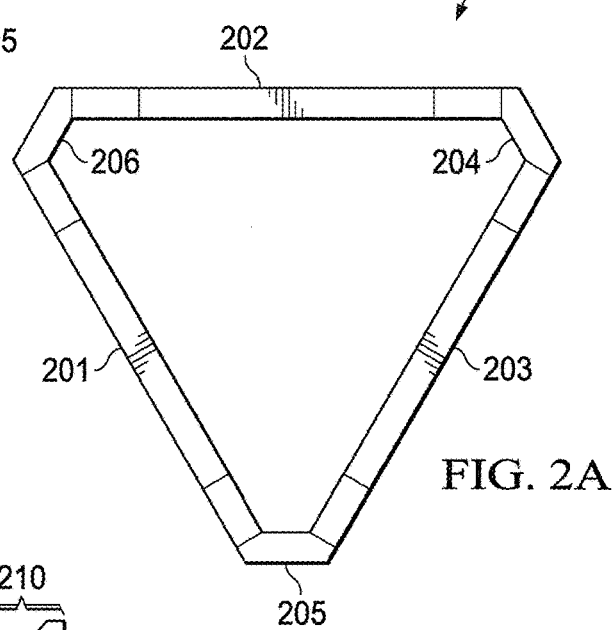
FIG. 2A is a top view of the metering structure of FIG. 1.
Figure 2B:
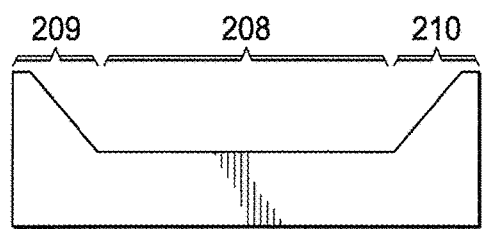
FIG. 2B a side view of a side beam from the metering structure of FIGS. 1, 2 and 2A.
Figure 2C:
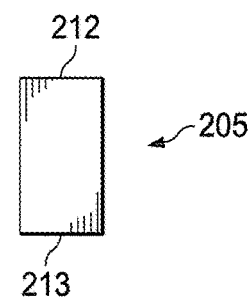
FIG. 2C a side view of an end piece from the metering structure of FIGS. 1, 2 and 2A.

FIG. 2 is a perspective view of the metering structure 112 within the telescope support assembly 100 of FIG. 1, and FIG. 2A is a top view of the metering structure 112 while FIG. 2B a side view of a side beam from the metering structure 112 and FIG. 2C a side view of an end piece from the metering structure 112. The metering structure 112 is generally triangular, as illustrated in FIG. 2A, formed by three side beams 201, 202 and 203 and three end pieces 204, 205 and 206. Each of the beams 201, 202 and 203 forming one side of a triangle, has a thickness of about 3 inches and a cross-sectional height-to-thickness aspect ratio of approximately 3-to-1. Thin (about 0.1 inch) shear panels are bonded onto beams. The three beams 201, 202 and 203 are connected at the corners by the end pieces 204, 205 and 206, formed by tower-like beams having a construction similar to the three beams 201, 202 and 203. The load interfaces, for the metering structure—mounting structures 104 and 108 in FIG. 1, or direct connections in the absence of one or both of such structures—are exclusively at the top and bottom of the end pieces 204, 205 and 206. Each of the end pieces 204, 205 and 206 is connected between the ends of two of the side beams 201, 202 and 203: end piece 204 is connected between the ends side beams 202 and 203, end piece 205 is connected between the ends of side beams 201 and 203, and end piece 206 is connected between the ends of side beams 201 and 202. In the example depicted, the end pieces 204, 205 and 206 extend across the corners of the triangle formed by side beams 201, 202 and 203, truncating those corners.

Each of the side beams 201, 202 and 203 has the shape of side beam 202 depicted in FIG. 2B. The height of the side beams 201, 202 and 203 (e.g., relative to a bottom 207 of the respective side panel) is smaller in central regions 208 of the side beams than at the ends 209, 210 of the side beams. The different heights, with taller corners, may facilitate attachment of mounting structures 104, 108 for various strut connections. In the example shown, portions of the tops of the side beams 201, 202 and 203 are sloped from the height of the central region 208 toward a maximum height at the ends 209, 210.

Each of the end pieces 204, 205 and 206 has the structure of end piece 205 depicted in FIG. 2C. Each end piece 204, 205 and 206 is generally rectangular with a top 212 and a bottom 213 configured for connection of support loads. In the example shown, the tops 212 of the end pieces 204, 205 and 206 extend above upper corners on the ends 209, 210 of the side beams 201, 202 and 203. That extension facilitates connection of mounting structures 104 to the tops 212 of the end pieces 204, 205 and 206. Alternatively, the top 212 of end pieces 204, 205 and 206 could be even with the highest points on the ends 209, 210, with notches in the upper corners of those ends 209, 210 to accommodate mounting structures 104. Likewise, the bottom 213 of the end pieces 204, 205 and 206 could extend below the bottom 207 of the side beams 201, 202 and 203 to facilitate connection of mounting structure 108.

Referring back to FIG. 1, taken in conjunction with FIGS. 2 and 2A through 2C, the tops 212 and the bottoms 213 of the end pieces 204, 205 and 206 in metering structure 112 are configured for connection of all support loads in the telescope support assembly, and all support loads connected to the metering structure 112 are connected to either the top 212 of one of the end pieces 204, 205 and 206 or the bottom 213 of one of the end pieces 204, 205 and 206. For that reason, the secondary mirror focus struts are preferably each mounted directly or indirectly on a top 212 of each one of the end pieces 204, 205 and 206. The secondary mirror struts are mounted in pairs and, as described above, support the secondary mirror assembly including the secondary mirror support, the secondary mirror held by the secondary mirror support, etc.

A mounting structure 108 is preferably mounted on a bottom 213 of each one of the end pieces 204, 205 and 206. Each mount structure 108 is connected to the primary mirror struts 106 connected to the primary mirror support 107, pairs of the base struts 109 connected to the base 110, and instrument struts 111 connected to a housing (not shown) for one or more instruments. The support loads transmitted from the mounting structures 104, 108 to the metering structure 112 are thus applied only to the end pieces 204, 205 and 206 at the corners of the triangular metering structure 112. This includes specifically the support loads transmitted through the primary mirror struts 106 and the secondary mirror struts 103, as well as the base struts 109 and the instrument struts 111. Where prior designs may have connected support loads (e.g., those associated with primary mirror support) to points along the length of the side beams for a metering structure, support loads are only connected to the metering structure 112 of the present disclosure at three corners, such that the metering structure 112 need only be a triangular frame. Because no loads are supported along the mid-span of the triangle legs for the metering structure 112 of the present disclosure, bending loads are eliminated and high stiffness may be achieved with low weight.

Alternative metering structure designs for telescopes employ a large composite panel structure, usually sandwich panels with face sheets on top and bottom and optionally filled with core fill and/or custom designed with ribs in places where strength or stiffness are required. In such alternative designs, aft optics or other supported hardware are interfaced to the metering structure are various locations on the underside of the metering structure, including along spans between corners of the metering structure. If the support for the primary mirror for large aperture telescopes uses short struts connecting three points on the primary mirror support to six points along the spans of the metering structure, a very large, heavy, and expensive composite structure with many internal panels surrounded by face sheets is usually required for the metering structure. In addition, if the primary mirror support struts connect to the metering structure at some moderate radial distance from the central longitudinal axis of the primary and secondary mirror assembly, while struts supporting the secondary mirror join the same metering structure at a much larger radius that is not at all close to the radial distance at which the primary mirror struts connect, the metering structure must be very stiff between the interfaces to the secondary mirror struts and primary mirror struts. This also forces the metering structure to react bending loads, in turn requiring larger dimensions and adding weight to the metering structure.

The metering structure 112 of the present disclosure employs vertical, rectangular end pieces for connection to support loads. In that respect, the connections of primary mirror struts and secondary mirror struts are at the same radial distance from the central longitudinal axis. Because the primary mirror struts and the secondary mirror struts are brought to a common set of corner locations on the metering structure, along with the mounting struts and aft optics/instrument support struts, all major loads going to the metering structure come together at the three corners of the structure. That is, all four sets of struts (kinematic interfaces) are connected to the three corners of a simple triangular metering structure. This allows the metering structure itself to be nothing more than a stiff triangle connecting the three points, with no significant need for the metering structure to have stiffness at any other interface location.

Because no loads are supported by the metering structure 112 of the present disclosure anywhere other than at the corners of the triangle, at least the side beams of the triangle and optionally also the end pieces need not be panels spanning a large area, but may instead be implemented by tubular frames, possibly with interior truss networks. The telescope's aft optics are supported with separate structures that interface to the metering structure 112 only at the three corners. The metering structure 112 of the present disclosure also achieves modularity, in that the metering structure is independent of aft optics type, design, size or weight.

Figure 3:
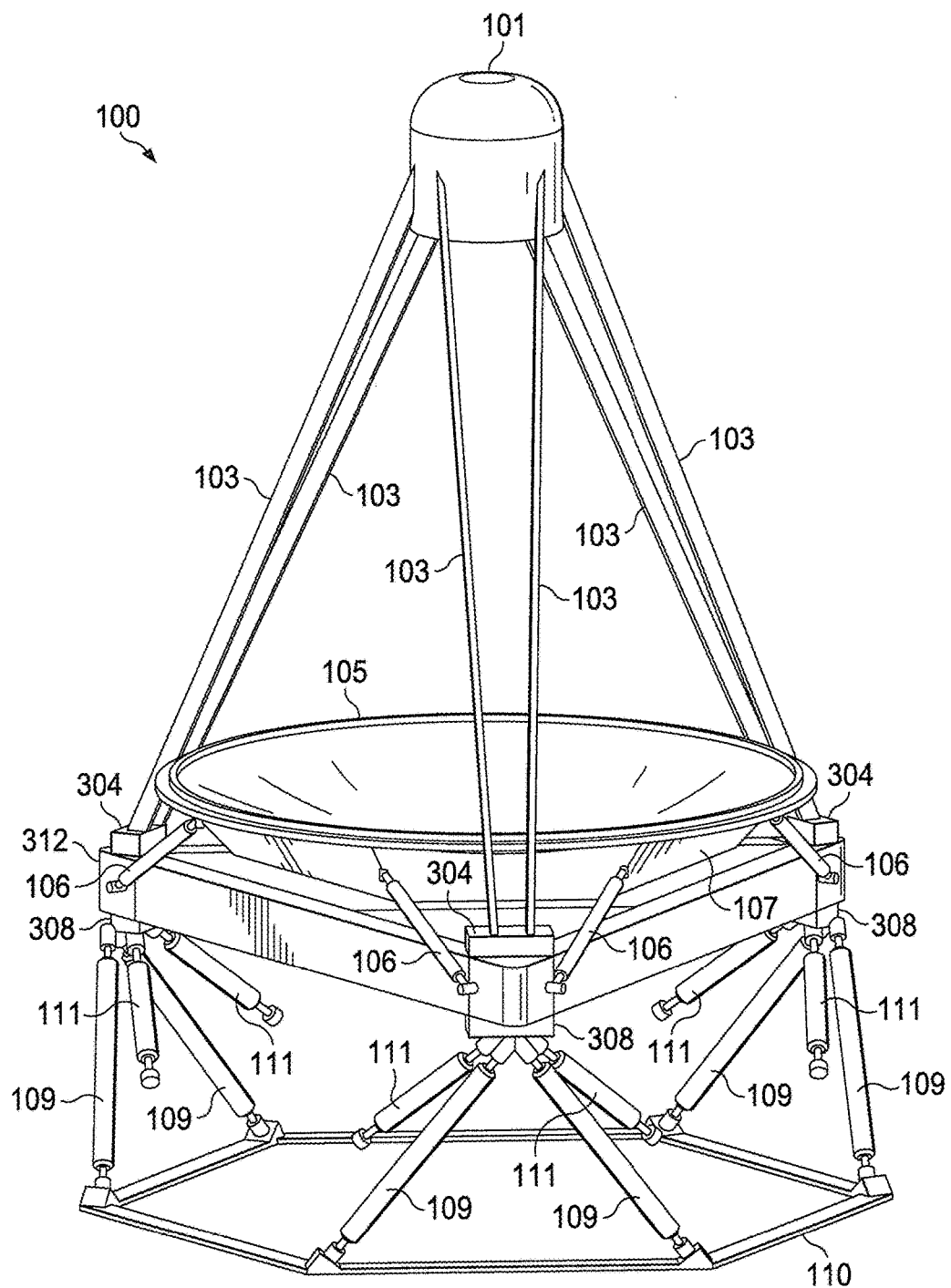
FIG. 3 illustrates an alternate telescope support assembly including a high-stiffness metering structure for large aperture telescopes in accordance with embodiments of the present disclosure.

FIG. 3 illustrates an alternate telescope support assembly including a high-stiffness metering structure for large aperture telescopes in accordance with embodiments of the present disclosure. End pieces 204, 205 and 206 need not have the tall, rectangular shape shown in FIGS. 2A through 2C. In the alternate design as shown in FIG. 3, the end pieces of the triangular metering structure 312 are simply end fittings, connected between the side beams, with all eight struts (per corner) attached at the top or bottom of those end fittings on mounting structure 304 or mounting structure 308. In the alternate design, the end pieces are each a single piece that connects at the corners of the triangular metering structure 312, with approximately the same height as (or possibly only slightly taller than) the side beams. That is, in the alternate design the corners of the triangle formed by the metering structure 312 are not truncated as shown in FIG. 1 and FIGS. 2 and 2A. Instead, the side beams are extended enough to form an actual triangle, with all of the secondary struts intersecting at the corners (with the end fittings forming the end pieces), at the same point as all of the other struts. While structurally more efficient than the design having the geometry shown in FIG. 1, the space available for the metering structure 112, 312 may not permit such extension of the side beams as in the embodiment of FIG. 3.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. §112(f).

What is claimed is:

1. A telescope support assembly, comprising:
   a metering structure consisting of a triangular frame formed by three side beams and three rectangular end pieces, each of the end pieces connected between ends of two of the side beams and truncating one corner of a triangle formed by the respective side beams,
   wherein the end pieces each include a top, a bottom, first and second opposing major surfaces extending between the respective top and bottom, and opposing side edges extending between the respective top and bottom and between the first and second major surfaces,
   wherein the end pieces are each configured for connection of support loads,
   wherein each side beam is connected at a first end to a side edge of a first of the end pieces and at a second end to a side edge of a second of the end pieces, and
   wherein each end piece is connected to an end of a first of the side beams at a first of the side edges of the respective end piece and to an end of a second of the side beams at a second of the side edges of the respective end piece;
   secondary mirror struts supporting a secondary mirror assembly, each secondary mirror strut connected to one of a plurality of first strut mounts, each first strut mount mounted on the metering structure at the top of one of the end pieces; and
   primary mirror struts supporting a primary mirror, each primary mirror strut connected to one of a plurality of second strut mounts, each second strut mount mounted on the metering structure at the bottom of one of the end pieces.

2. The telescope support assembly according to claim 1, wherein the tops of the end pieces extend above upper corners of the side beams.

3. The telescope support assembly according to claim 1, wherein bottom corners of the side beams include cut outs sized to accommodate end portions of strut mounts.

4. The telescope support assembly according to claim 1, wherein a height of each of the side beams is smaller in a central region of the respective side beam than at the ends of the respective side beam.

5. The telescope support assembly according to claim 1, wherein all support loads coupled to the metering structure are connected at a same radial distance from a central longitudinal axis.

6. The telescope support assembly according to claim 1, wherein the secondary mirror assembly includes a secondary mirror support, a secondary mirror held by the secondary mirror support, and a thermal shroud over the secondary mirror and the secondary mirror support.

7. The telescope support assembly according to claim 1, wherein each of the second strut mounts connects to a primary mirror support, to base struts connected to a base, and to instrument struts connected to a housing for one or more instruments.

8. A method, comprising:
  providing a telescope support assembly comprising:
    a metering structure consisting of a triangular frame formed by three side beams and three rectangular end pieces, each of the end pieces connected between ends of two of the side beams and truncating one corner of a triangle formed by the respective side beams,
    wherein the end pieces each include a top, a bottom, first and second opposing major surfaces extending between the respective top and bottom, and opposing side edges extending between the respective top and bottom and between the first and second major surfaces,
    wherein the end pieces are each configured for connection of support loads,
    wherein each side beam is connected at a first end to a side edge of a first of the end pieces and at a second end to a side edge of a second of the end pieces, and
    wherein each end piece is connected to an end of a first of the side beams at a first of the side edges of the respective end piece and to an end of a second of the side beams at a second of the side edges of the respective end piece;
  connecting secondary mirror struts supporting a secondary mirror assembly each to one of a plurality of first strut mounts, each first strut mount mounted on the metering structure at the top of one of the end pieces; and
  connecting primary mirror struts supporting a primary mirror each to one of a plurality of second strut mounts, each second strut mount mounted on the metering structure at the bottom of one of the end pieces.

9. The method according to claim 8, wherein the tops of the end pieces extend above upper corners of the side beams.

10. The method according to claim 8, wherein each of the side beams and each of the end pieces is formed by a tubular frame with stiffening shear panels.

11. The method according to claim 8, wherein a height of each of the side beams is smaller in a central region of the respective side beam than at the ends of the respective side beam.

12. The method according to claim 8, wherein all support loads coupled to the metering structure are connected at a same radial distance from a central longitudinal axis.

13. The method according to claim 8, further comprising:
  mounting a secondary mirror focus mechanism on the top of each one of the end pieces, wherein the secondary mirror assembly includes a secondary mirror support, a secondary mirror held by the secondary mirror support, a baffle surrounding the secondary mirror, and a thermal shroud over the secondary mirror and the secondary mirror support.

14. The method according to claim 8, wherein each of the second strut mounts connects to a primary mirror support, to base struts connected to a base, and to instrument struts connected to a housing for one or more instruments.

15. A telescope support assembly, comprising:
  a metering structure consisting of a triangular frame formed by three side beams and three rectangular end pieces, each of the end pieces connected between ends of two of the side beams and truncating one corner of a triangle formed by the respective side beams,
  wherein the end pieces each include a top, a bottom, first and second opposing major surfaces extending between the respective top and bottom, and opposing side edges extending between the respective top and bottom and between the first and second major surfaces,
  wherein the end pieces are each configured for connection of support loads,
  wherein each side beam is connected at a first end to a side edge of a first of the end pieces and at a second end to a side edge of a second of the end pieces,
  wherein each end piece is connected to an end of a first of the side beams at a first of the side edges of the respective end piece and to an end of a second of the side beams at a second of the side edges of the respective end piece;
  a secondary mirror focus mechanism mounted on first strut mounts each mounted on the top of one of the end pieces;
  secondary mirror struts mounted to the secondary mirror focus mechanism, the secondary mirror struts supporting a secondary mirror assembly including a secondary mirror support, a secondary mirror held by the secondary mirror support, a baffle surrounding the secondary mirror, and a thermal shroud over the secondary mirror and the secondary mirror support;
  second strut mounts each mounted on the bottom of one of the end pieces;
  primary mirror struts each connecting one of the second strut mounts to a primary mirror support;
  base struts each connecting one of the second strut mounts to a base; and
  instrument struts each connecting one of the second strut mounts to a housing for one or more instruments.

16. The telescope support assembly according to claim 15, wherein the tops of the end pieces extend above upper corners of the side beams.

17. The telescope support assembly according to claim 15, wherein each of the side beams and each of the end pieces is formed by a tubular frame with stiffening shear panels.

18. The telescope support assembly according to claim 15, wherein a height of each of the side beams is smaller in a central region of the respective side beam than at the ends of the respective side beam.

19. The telescope support assembly according to claim 15, wherein all support loads coupled to the metering structure are connected at a same radial distance from a central longitudinal axis.

20. The telescope support assembly according to claim 15, wherein the base is a hexagonal frame.

* * * * *